(12) United States Patent
Mogi et al.

(10) Patent No.: US 9,553,493 B2
(45) Date of Patent: Jan. 24, 2017

(54) ROTATING ELECTRIC MACHINE

(71) Applicant: HONDA MOTOR CO., LTD., Tokyo (JP)

(72) Inventors: Seiichi Mogi, Tochigi-ken (JP); Shinji Fujimoto, Utsunomiya (JP); Takaaki Kuwabara, Tochigi-ken (JP); Shingo Kato, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/384,855

(22) PCT Filed: Mar. 15, 2013

(86) PCT No.: PCT/JP2013/057440
§ 371 (c)(1),
(2) Date: Sep. 12, 2014

(87) PCT Pub. No.: WO2013/146358
PCT Pub. Date: Oct. 3, 2013

(65) Prior Publication Data
US 2015/0061424 A1 Mar. 5, 2015

(30) Foreign Application Priority Data
Mar. 30, 2012 (JP) .................. 2012-081160

(51) Int. Cl.
*H02K 9/19* (2006.01)
*H02K 1/32* (2006.01)

(52) U.S. Cl.
CPC . *H02K 9/19* (2013.01); *H02K 1/32* (2013.01)

(58) Field of Classification Search
CPC .......... H02K 9/19; H02K 1/22; H02K 1/2786; B60K 7/0007; B60K 2001/006; B60L 2220/44

(Continued)

(56) References Cited

U.S. PATENT DOCUMENTS 7,228,928 B2 * 6/2007 Mizutani et al. .......... 180/65.51
7,938,212 B2 * 5/2011 Sakuma et al. ............ 180/65.51

(Continued)

FOREIGN PATENT DOCUMENTS

JP    2003-324901 A    11/2003
JP    2009-019522 A     1/2009

(Continued)

OTHER PUBLICATIONS

International Search Report dated Jun. 4, 2013, issued in corresponding application No. PCT/JP2013/057440.

(Continued)

*Primary Examiner* — Burton Mullins
(74) *Attorney, Agent, or Firm* — Westerman, Hattori, Daniels & Adrian, LLP

(57) ABSTRACT

Provided is a rotating electric machine the interior of which can be suitably cooled. A coolant supply means of the rotating electric machine supplies a cooling fluid to the bottom of a tubular member from a location closer to one end of a rotary shaft than the bottom, and the bottom of the tubular member is equipped with through-holes that run in the axial direction of the rotary shaft, with the cooling fluid being supplied to the interior of the tubular member through the through-holes.

7 Claims, 4 Drawing Sheets

(58) Field of Classification Search
USPC .................................. 310/54, 58, 61, 266
See application file for complete search history.

(56) References Cited

U.S. PATENT DOCUMENTS

| | | | |
|---|---|---|---|
| 8,080,908 B2 | 12/2011 | Matsubara et al. | |
| 8,188,625 B2* | 5/2012 | Fukushima | 310/54 |
| 8,203,241 B2* | 6/2012 | Tanaka | 310/54 |
| 2006/0138879 A1* | 6/2006 | Kusase et al. | 310/67 R |
| 2011/0074233 A1 | 3/2011 | Okada et al. | |
| 2012/0112580 A1* | 5/2012 | Sato et al. | 310/71 |
| 2013/0153338 A1* | 6/2013 | Yamauchi | 184/26 |
| 2013/0169073 A1* | 7/2013 | Nagahama et al. | 310/43 |

FOREIGN PATENT DOCUMENTS

| | | | |
|---|---|---|---|
| JP | 2009-261214 | * 11/2009 | H02K 9/19 |
| JP | 2011-083139 A | 4/2011 | |
| JP | 2011-120417 A | 6/2011 | |
| JP | 2012-65500 A | 3/2012 | |
| WO | 2009/147798 A1 | 12/2009 | |

OTHER PUBLICATIONS

Office Action dated Mar. 1, 2016, issued in counterpart Chinese Patent Application No. 201380015281.1, with English translation. (10 pages).

\* cited by examiner

ROTATING ELECTRIC MACHINE

TECHNICAL FIELD

The present invention relates to a rotary electric machine that makes it possible to cool the inside of the rotary electric machine.

BACKGROUND ART

According to Japanese Laid-Open Patent Publication No. 2003-324901 (hereinafter referred to as "JP 2003-324901 A"), several structures for cooling the inside of the rotary electric machine are disclosed (see FIGS. 1 through 11). In some of the disclosed structures, an oil coolant is supplied radially outward of the rotary electric machine from the inside thereof, such that an oil coolant is circulated through the inside of a shaft 28 (see FIGS. 7 and 8).

SUMMARY OF INVENTION

If the oil coolant is supplied to the inside of the rotary electric machine through the inside of the rotary shaft, as disclosed in FIGS. 7 and 8 of JP 2003-324901 A, the specifications of the coolant supply passage such as the number, position, and size of the holes are limited in view of the strength of the rotary shaft. Thus, there is still room for improvement in the technique, for cooling the inside of the rotary electric machine.

The present invention has been made in view of the aforementioned problem. An object of the present invention is to provide a rotary electric machine that can suitably cool the inside of the rotary electric machine.

According to the present invention, a rotary electric machine includes a motor rotor and a coolant supply unit configured to supply a cooling fluid for cooling the motor rotor. The motor rotor includes a rotational shaft, a tubular member having a bottom wall on one end side of the rotational shaft and an opening on another end side of the rotational shaft, the bottom wall being fixed to an outer circumferential surface of the rotational shaft, and a rotor core fixed to an outer circumferential surface of the tubular member. The coolant supply unit supplies the cooling fluid from the one end side of the rotational shaft with respect to the bottom wall of the tubular member, to the bottom wall of the tubular member. The bottom wall of the tubular member has a through hole extending along an axial direction of the rotational shaft. The cooling fluid is supplied through the through hole to inside of the tubular member.

According to the present invention, the cooling fluid is supplied to the bottom wall (outside) of the tubular member, and enters the tubular member through the through hole. Thus, it is possible to cool a member disposed in the tubular member or the rotor core fixed to the outer circumferential surface of the tubular member.

The tubular member has the opening remote from the bottom wall (on another end side of the rotational shaft). In this case, the cooling fluid, which is supplied to the inside of the tubular member from the side of the bottom wall, can be discharged from the tubular member through the opening. Therefore, the cooling fluid is prevented from entering an air gap between the motor rotor and the motor stator facing the motor rotor, and thus the rotational resistance of the rotary electric machine is prevented from being increased.

Further, the through hole for guiding the cooling fluid to the inside of the tubular member is formed in the bottom wall of the tubular member. Therefore, compared with the case in which the through hole is provided only in the rotational shaft, various routes can be provided for supplying the cooling fluid to the inside of the tubular member. Also, various specifications such as a flow rate or supply pressure of the cooling fluid can be set more flexibly, which are otherwise difficult to select due to the restriction of the specifications such as the dimension and strength of the rotational shaft when the through hole is to be formed in the rotational shaft, for example.

The annular protrusive wall may be formed on the bottom wall of the tubular member, and project toward the one end side of the rotational shaft from a portion positioned radially outward of the through hole.

In the above structure, the reservoir for the cooling fluid is formed radially inward of the protrusive wall under centrifugal forces that act on the cooling fluid during rotation of the motor rotor. The cooling fluid can be supplied from the reservoir through the through hole to the inside of the tubular member. Therefore, even if the supply pressure of the coolant supply unit is relatively small, the cooling fluid can be supplied through the through hole to the inside of the tubular member. As a result, when an electric pump is used as the coolant supply unit, the amount of workload by the electric pump can be reduced.

In a case a pump is mechanically coupled to the rotary electric machine and operates as the coolant supply unit by the drive force of the rotary electric machine, the supply amount or supply pressure of the cooling fluid tends to be small at the time of low-speed rotation of the rotary electric machine since the output of the pump is small. Even in such a case, because the cooling fluid can be pooled on the annular protrusive wall, an insufficient supply of the cooling fluid to the inside of the tubular member can be prevented by guiding the cooling fluid to the through hole easily. Stated otherwise, drive conditions such as the speed of rotation of the rotary electric machine have less effect on the supply amount of the cooling fluid by the pump.

The coolant supply unit may have an outlet hole on the one end side of the rotational shaft with respect to the bottom wall of the tubular member, the outlet hole configured to supply the cooling fluid toward the bottom wall of the tubular member, and the outlet hole may be disposed radially inward of the first protrusive wall and face the bottom wall of the tubular member in the axial direction. In this structure, the cooling fluid can be guided to the reservoir efficiently, since the cooling fluid, which is supplied toward the bottom wall of the tubular member, is guided to the reservoir formed radially inward of the protrusive wall by gravity. Further, the cooling fluid, which reaches the bottom wall of the tubular member radially inward of the protrusive wall from the outlet hole, is guided to the reservoir under centrifugal forces that act on the cooling fluid. Thus, the cooling fluid can be guided to the reservoir efficiently.

The coolant supply unit may include an axial flow passage formed in the rotational shaft, and an axial opening configured to establish communication between the axial flow passage and outside of the rotational shaft, and wherein the protrusive wall may have a portion that overlaps with the axial opening, as viewed along a radial direction of the motor rotor. In this structure, the cooling fluid, which overflows the axial flow passage, is guided to the reservoir formed radially inward of the protrusive wall under centrifugal forces or by gravity. Thus, the cooling fluid can be guided to the reservoir efficiently.

An inner circumferential surface of the protrusive wall may have a greater-diameter portion, which is progressively greater in diameter in a direction from the one end side to the other end side of the rotational shaft. In this structure, the greater-diameter portion can guide the cooling fluid from the one end side to the other end side of the rotational shaft under centrifugal forces that act on the cooling fluid during rotation of the motor rotor. Accordingly, the greater-diameter portion can enhance the movement of the cooling fluid in the tubular member, and thereby effectively cool the members such as the rotor core.

A rotor of a rotary sensor may be fixed to the protrusive wall. Therefore, the protrusive wall functions both to provide the reservoir for the cooling fluid, and to retain the rotor of the rotary sensor. Consequently, the rotary electric machine can be simpler in structure than if a member for retaining the rotor were provided separately from the protrusive wall.

A gear mechanism, which is coupled to the rotational shaft, may be disposed in the tubular member. In the above structure, by disposing the gear mechanism in the tubular member, it is possible to reduce the dimension of the rotary electric machine along the axial direction. Further, in addition to cooling the rotor core, it also is possible to cool or lubricate the gear mechanism (assuming that the cooling fluid doubles as a lubricating oil). Therefore, as opposed to providing the cooling structure for the rotor core and the cooling structure for the gear mechanism separately from each other, the structure can be made simpler.

A second protrusive wall may be formed on the bottom wall of the tubular member and project toward the other end side of the rotational shaft from a portion positioned radially outward of the through hole, and a distal end of the second protrusive wall may overlap with a portion of a gear of the gear mechanism, as viewed along the radial direction of the motor rotor. In the above structure, the cooling fluid, which scatters under centrifugal forces radially, is guided to the gear of the gear mechanism, and can be used to cool or lubricate the gear (assuming that the cooling fluid doubles as a lubricating oil). Thereafter, the cooling fluid, which has been used to cool or lubricate the gear, further moves under centrifugal forces radially. When the cooling fluid reaches an inner circumferential surface of the tubular member, the cooling fluid can also cool the rotor core.

A frictional engagement unit, which is coupled to the rotational shaft, may be disposed in the tubular member. In the above structure, by disposing the frictional engagement unit (e.g., clutch mechanism) in the tubular member, it is possible to reduce the dimension of the rotary electric machine along the axial direction. Further, in addition to cooling the rotor core, it also is possible to cool or lubricate the frictional engagement unit (assuming that the cooling fluid doubles as a lubricating oil). Therefore, as opposed to providing the cooling structure for the rotor core and the cooling structure for the frictional engagement unit separately from each other, the structure can be made simpler.

DESCRIPTION OF EMBODIMENTS

A. Embodiment

1. Description of Overall Arrangement 1-1. Overall Arrangement

Figure 1:
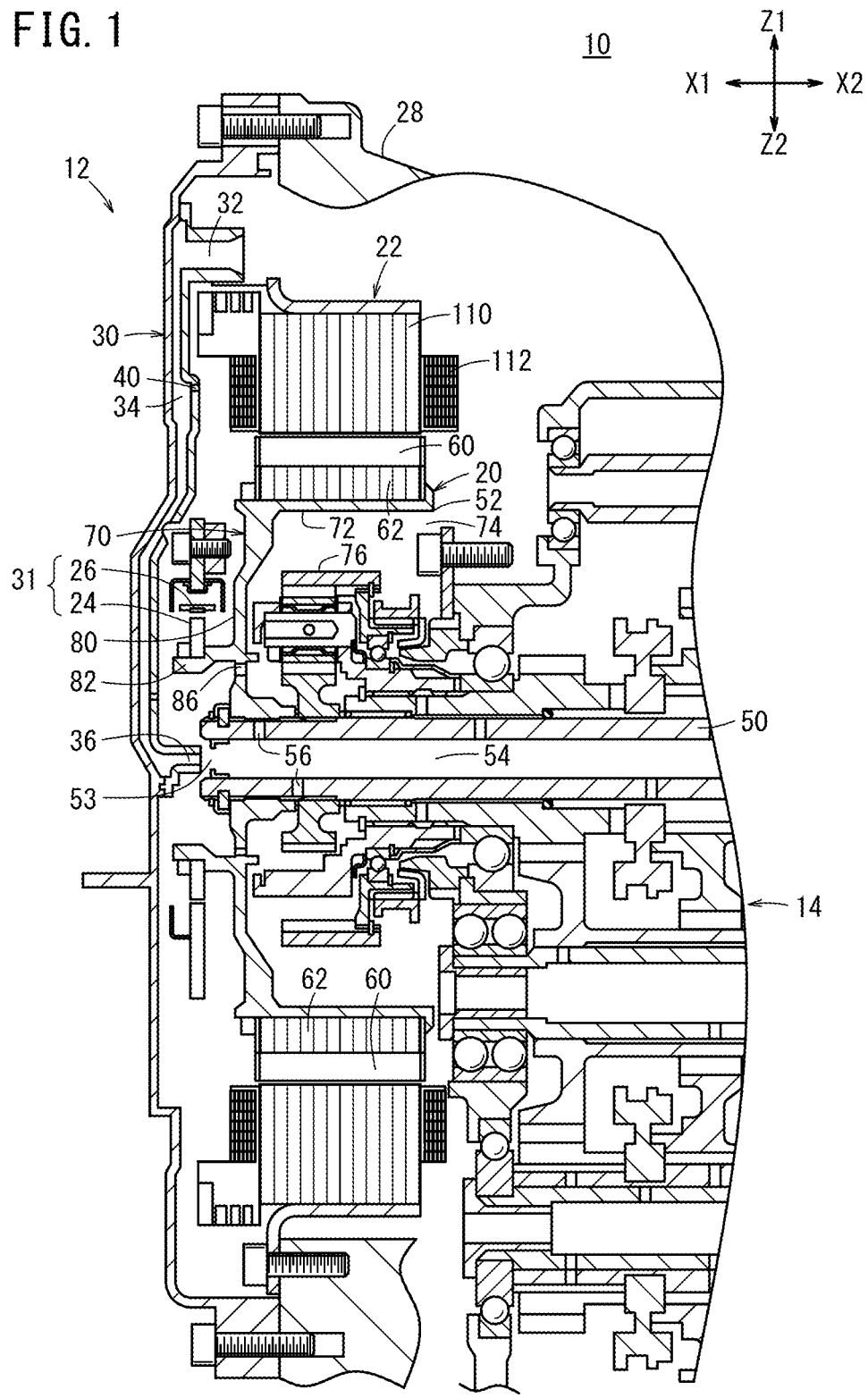
FIG. 1 is a fragmentary cross-sectional view of a vehicle, especially a cooling system thereof, in which there is incorporated a motor that serves as a rotary electric machine according to an embodiment of the present invention.
Figure 2:
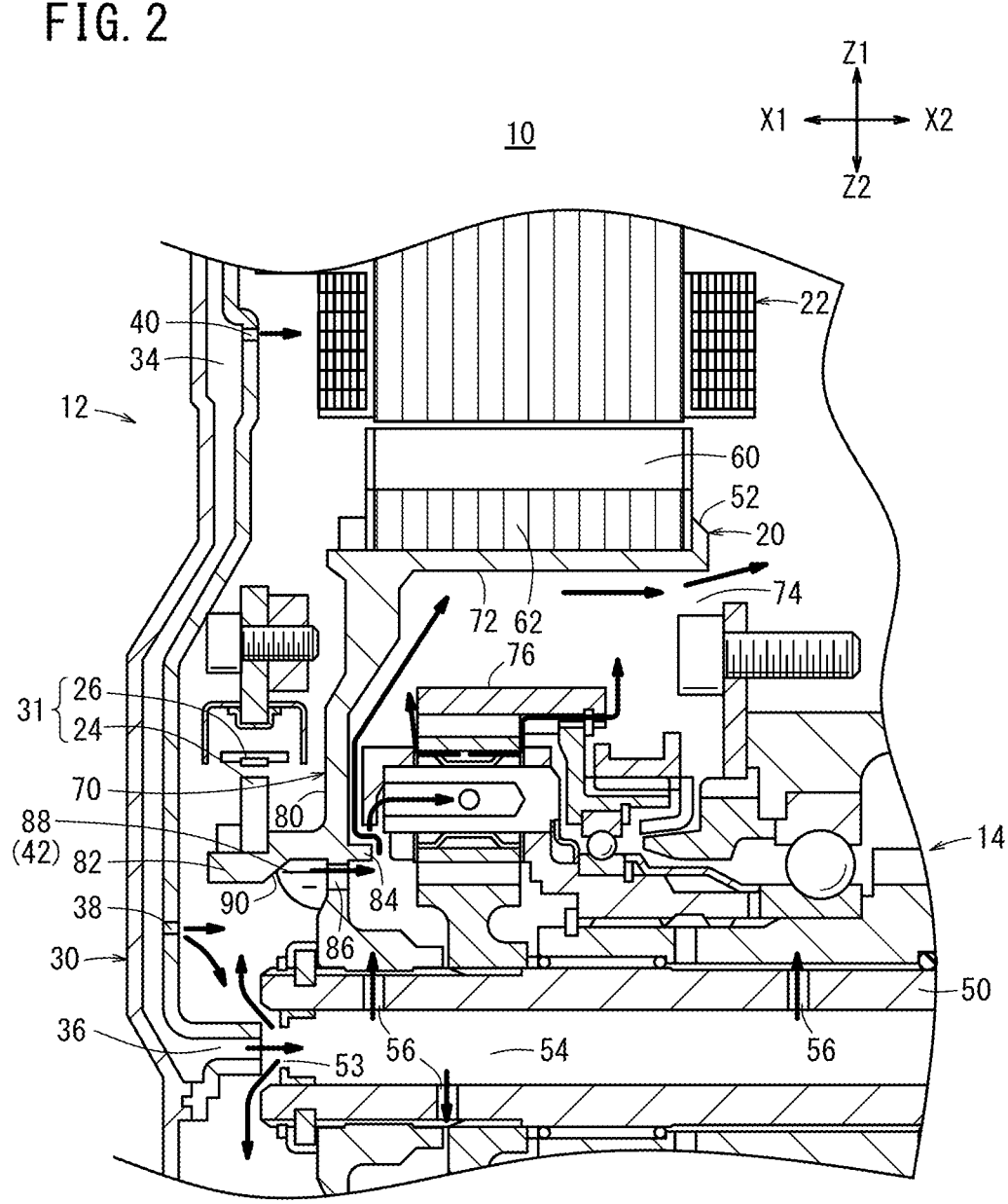
FIG. 2 is an enlarged fragmentary cross-sectional view showing flows of an oil coolant in the motor.

FIG. 1 is a fragmentary cross-sectional view of a vehicle 10, especially a cooling system (coolant supply unit) thereof, which incorporates a motor 12 as a rotary electric machine according to an embodiment of the present invention. FIG. 2 is an enlarged fragmentary cross-sectional view showing flows of an oil coolant 42 in the motor 12. In FIG. 2, the thick arrows represent flows of the oil coolant 42. It should be noted that, for facilitating understanding of the present invention, FIGS. 1 and 2 are cross-sectional views taken along line I-I of FIG. 4, to be described later. Further, a side cover 30 (to be described later) in FIGS. 1 and 2 is shown in cross section (taken along line I-I of FIG. 3) through all of an inlet hole 32 and first through third outlet holes 36, 38, 40, to be described later (see FIG. 3).

As shown in FIG. 1, the vehicle 10 has a speed reducer 14, which serves as a gear mechanism, in addition to the motor 12. A portion of the speed reducer 14 is disposed in the motor 12.

The motor 12 serves as a drive source for generating a drive force F for the vehicle 10. The motor 12 comprises a three-phase AC brushless motor for generating the drive force F for the vehicle 10 based on electric power supplied from a non-illustrated battery through a non-illustrated inverter. The motor 12 also regenerates electric power (regenerative electric power Preg) [W] in a regenerative mode, and outputs the regenerative electric power Preg to the battery in order to charge the battery. The regenerative electric power Preg may be output to a 12-volt system or a non-illustrated accessory device.

As shown in FIGS. 1 and 2, the motor 12 has a motor rotor 20 (hereinafter also referred to as a "rotor 20"), a motor stator 22 (hereinafter also referred to as a "stator 22"), a resolver rotor 24, a resolver stator 26, a motor housing 28, and the side cover 30. The resolver rotor 24 and the resolver stator 26 jointly make up a resolver 31.

1-2. Cooling System 1-2-1. Side Cover 30

Figure 3:
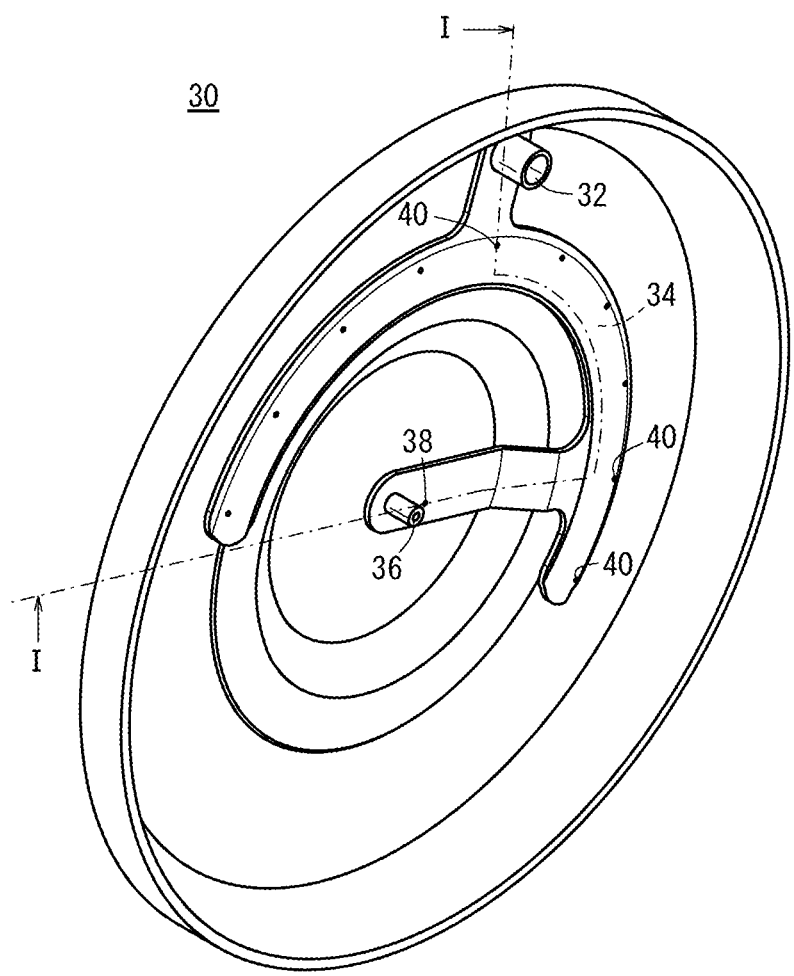
FIG. 3 is a perspective view of a side cover that functions as a portion of the cooling system.

FIG. 3 is a perspective view of the side cover 30, which functions as a portion of the cooling system. As shown in FIGS. 1 through 3, the side cover 30 has a single inlet hole 32, a flow passage 34, a single first outlet hole 36, a single second outlet hole 38, and a plurality of third outlet holes 40. The first through third outlet holes 36, 38, 40 are supplied with an oil coolant 42 from a non-illustrated pump, which may be an electric pump or a mechanical pump.

As shown in FIGS. 1 through 3, according to the present embodiment, the oil coolant 42 is ejected or discharged from the side cover 30 toward the rotor 20 and the stator 22.

More specifically, the first outlet hole 36 ejects or discharges the oil coolant 42 primarily toward a rotational shaft 50 of the rotor 20. The second outlet hole 38 ejects or discharges the oil coolant 42 primarily toward a tubular member 52 of the rotor 20. The third outlet hole 40 ejects or discharges the oil coolant 42 primarily toward the stator 22. Each of the outlet holes 36, 38, 40 is in the form of a nozzle for ejecting or discharging the oil coolant 42.

1-2-2. Motor Rotor 20

1-2-2-1. Rotational Shaft 50

As shown in FIGS. 1 and 2, the rotational shaft 50 of the rotor 20 has an axial opening 53 for supplying the oil coolant 42 to the inside of the rotational shaft 50, a single first axial flow passage 54 that extends along axial directions X1, X2 (see FIG. 1), and a plurality of second axial flow passages 56, which establish fluid communication along radial directions R1, R2 (see FIG. 4) of the motor 12 between the first axial flow passage 54 and the outside of the rotational shaft 50.

The oil coolant 42, which is supplied from the first outlet hole 36 of the side cover 30, is guided through the first axial flow passage 54 into the second axial flow passages 56, and then is discharged through the second axial flow passages 56 from the rotational shaft 50. The discharged oil coolant 42 is supplied to the inside of the rotor 20 or to a portion of the speed reducer 14.

1-2-2-2. Tubular Member 52

1-2-2-2-1. General

As shown in FIG. 2, etc., the rotor 20 has, in addition to the rotational shaft 50, a bottomed tubular member 52, a rotor core 60, and a rotor yoke 62.

The tubular member 52 includes a bottom wall 70 fixed to the outer circumferential surface of the rotational shaft 50 near the side cover 30, and a side wall 72 that extends in the axial direction X2 from the outer edge of the bottom wall 70. The side wall 72 opens remotely from the bottom wall 70, i.e., the side wall 72 has an opening 74 remote from the bottom wall 70. The speed reducer 14 has a planet gear 76 disposed in the tubular member 52.

1-2-2-2-2. Bottom Wall 70

As shown in FIG. 2, the bottom wall 70 includes a base 80, a first protrusive wall 82, and a second protrusive wall 84. The base 80 extends from the rotational shaft 50 along the radial direction R1. The base 80 has a plurality of through holes 86 defined in a portion thereof. The through holes 86 extend along the axial directions X1, X2 through the bottom wall 70 (base 80).

Figure 4:
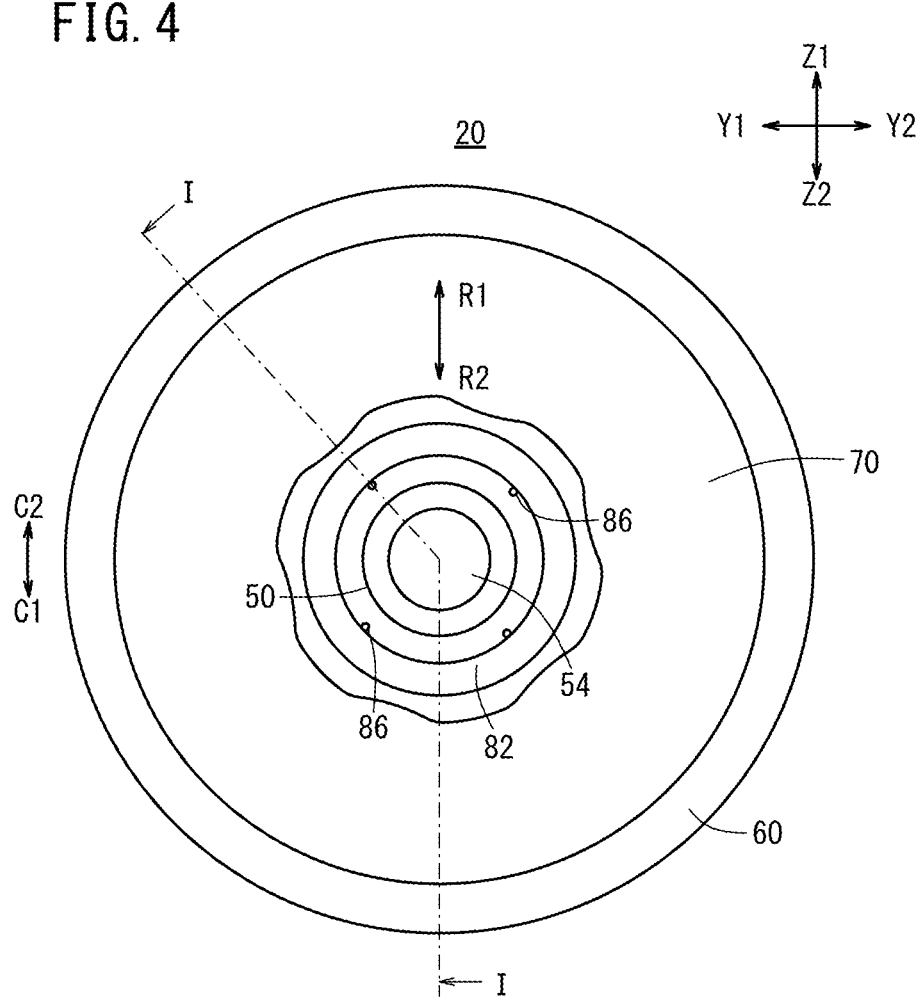
FIG. 4 is a plan view, which is illustrated in a simplified form, showing the positions of through holes in a motor rotor.

FIG. 4 is a plan view showing the positions of the through holes 86 in the motor rotor 20, which is illustrated in a simplified form. As shown in FIG. 4, according to the present embodiment, there are four through holes 86, which are spaced at equal intervals. The oil coolant 42, which is ejected from the side cover 30 toward the bottom wall 70, is supplied through the through holes 86 to the inside of the tubular member 52.

The first protrusive wall 82 projects toward the side cover 30 (along the direction X1) from a portion positioned radially outward (along the direction R1) of the through holes 86. The first protrusive wall 82 has an annular shape. For this reason, if the oil coolant 42, which is ejected or discharged from the side cover 30 toward the bottom wall 70 during rotation of the rotor 20, does not enter the through holes 86 directly, then the oil coolant 42 remains in an inner circumferential region of the first protrusive wall 82, i.e., a region surrounded by the base 80 and the first protrusive wall 82, under centrifugal forces that act on the oil coolant 42. Stated otherwise, the base 80 and the first protrusive wall 82 jointly provide a reservoir 88 for the oil coolant 42. Therefore, even if the oil coolant 42 does not enter the through holes 86 directly, the oil coolant 42 remains in the reservoir 88 and thereafter is supplied through the through holes 86 to the inside of the tubular member 52.

The first protrusive wall 82 has a portion that overlaps with the axial opening 53 of the rotational shaft 50, as viewed along the radial directions R1, R2 of the rotor 20. Therefore, the oil coolant 42, which overflows the first axial flow passage 54 through the axial opening 53, remains in the inner circumferential region of the first protrusive wall 82 under centrifugal forces or by gravity, and thereafter, the oil coolant 42 is supplied through the through holes 86 to the inside of the tubular member 52 (see FIG. 2). Consequently, the oil coolant 42, which flows over the first axial flow passage 54 through the axial opening 53, can be used to cool the rotor core 60 efficiently.

In addition, as shown in FIG. 2, the first protrusive wall 82 has a greater-diameter portion 90, which is progressively greater in diameter in a direction from the side cover 30 toward the base 80 of the bottom wall 70, i.e., in the direction X2. The greater-diameter portion 90 makes it easy for the reservoir 88 to be formed radially inward of the first protrusive wall 82, i.e., in the direction R2, thereby minimizing the amount of oil coolant 42 that does not enter into the tubular member 52 after being supplied radially inward of the first protrusive wall 82, i.e., in the direction R2. In FIG. 2, the first protrusive wall 82 is shown as being increased in diameter in both radial inward and radial outward directions. However, even if the first protrusive wall 82 is increased in diameter in the radial inward direction only, the first protrusive wall 82 is capable of operating in the aforementioned manner to offer the advantages described above.

The resolver rotor 24, i.e., the rotor of a rotary sensor, is fixed to a radial outer surface of the first protrusive wall 82, i.e., a surface thereof that faces in the direction R1. Therefore, the first protrusive wall 82 functions both to provide the reservoir 88 for the oil coolant 42, and to retain the resolver rotor 24. Consequently, the motor 12 can be simpler in structure than if a member for retaining the resolver rotor 24 were provided separately from the first protrusive wall 82.

As shown in FIG. 2, the second protrusive wall 84 projects toward the opening 74 (along the direction X2 in FIG. 2) from a portion positioned radially outward (along the direction R1) of the through holes 86. The second protrusive wall 84 has an annular shape. A distal end of the second protrusive wall 84 overlaps with a portion of the planet gear 76, as viewed along a radial outward direction of the rotor 20 (along the direction R1). Therefore, the oil coolant 42, which is guided by the second protrusive wall 84, is supplied to a portion of the planet gear 76 when the oil coolant 42 is discharged under centrifugal forces in a radial outward direction (along the direction R1).

1-2-2-2-3. Side Wall 72

As shown in FIGS. 1 and 2, the rotor core 60 and the rotor yoke 62 are fixed to a radial outer surface (which faces in the direction R1) of the side wall 72 of the tubular member 52. As described above, the oil coolant 42 is supplied from the side cover 30 to the inside of the tubular member 52 through the rotational shaft 50 or the bottom wall 70 of the tubular member 52. Thereafter, as the oil coolant 42 moves along the side wall 72 while the rotor 20 rotates, the oil coolant 42 cools the rotor core 60.

The oil coolant 42, which has reached the side wall 72, moves along the side wall 72 into the opening 74 from which the oil coolant 42 is discharged. Thereafter, the oil coolant 42, which is discharged from the opening 74, is pooled on the bottom (not shown) of the motor housing 28, whereupon the oil coolant 42 is ejected or discharged again from the side cover 30 toward the rotor 20 or the stator 22 by the pump. Heat from the oil coolant 42 may undergo heat transfer by a cooler or a warmer, not shown, before the oil coolant 42 is ejected or discharged again.

1-2-3. Motor Stator 22

The oil coolant 42, which is supplied from the third outlet holes 40 of the side cover 30, passes through the stator 22 while cooling various parts of the stator 22, and drops onto the bottom of the motor housing 28.

As shown in FIG. 2, etc., the resolver stator 26 is disposed on the motor stator 22 radially outward of the resolver rotor 24 along the direction R1. The resolver stator 26 produces an output signal depending on the rotational angle of the resolver rotor 24. Therefore, the resolver 31 is capable of detecting the rotational angle of the motor rotor 20.

2. Advantages of the Present Embodiment

According to the present embodiment, as described above, the oil coolant 42 is supplied to the bottom wall 70 (outside) of the tubular member 52, and enters the tubular member 52 through the through holes 86. Thus, it is possible to cool a member (planet gear 76) disposed in the tubular member 52 or the rotor core 60 fixed to the outer circumferential surface of the tubular member 52.

The tubular member 52 has the opening 74 remote from the bottom wall 70 (on another end side of the rotational shaft 50). In this case, the oil coolant 42, which is supplied to the inside of the tubular member 52 from the side of the bottom wall 70, can be discharged from the tubular member 52 through the opening 74. Therefore, the oil coolant 42 is prevented from entering an air gap between the motor rotor 20 and the motor stator 22 facing the motor rotor 20, and thus the rotational resistance of the motor 12 is prevented from being increased.

Further, the through holes 86 for guiding the oil coolant 42 to the inside of the tubular member 52 are formed in the bottom wall 70 of the tubular member 52. Therefore, compared with the case in which the through holes 86 are provided only in the rotational shaft 50, various routes can be provided for supplying the oil coolant 42 to the inside of the tubular member 52. Also, when through holes (first axial flow passage 54 and second axial flow passages 56) are to be formed in the rotational shaft 50, for example, various specifications such as a flow rate or supply pressure of the oil coolant 42 can be set more flexibly, which are otherwise difficult to select due to the restriction of the specifications such as the dimension and strength of the rotational shaft 50.

In the present embodiment, the annular first protrusive wall 82 is formed on the bottom wall 70 of the tubular member 52, and projects toward (along the direction X1) one end side of the rotational shaft 50 from a portion positioned radially outward (along the direction R1) of the through holes 86.

In the above structure, the reservoir 88 for the oil coolant 42 is formed radially inward, i.e., in the direction R2 of the first protrusive wall 82 under centrifugal forces that act on the oil coolant 42 during rotation of the rotor 20. The oil coolant 42 can be supplied from the reservoir 88 through the through holes 86 to the inside of the tubular member 52. Therefore, even if the supply pressure of an electric pump as a coolant supply unit is relatively small, the oil coolant 42 can be supplied through the through holes 86 to the inside of the tubular member 52. As a result, the amount of workload by the electric pump can be reduced.

In a case a pump is mechanically coupled to the motor 12 and operates as the coolant supply unit by the drive force of the motor 12, the supply amount or supply pressure of the oil coolant 42 tends to be small at the time of low-speed rotation of the motor 12 since the output of the pump is small. Even in such a case, because the oil coolant 42 can be pooled on the annular first protrusive wall 82, a short supply of the oil coolant 42 to the inside of the tubular member 52 can be prevented by guiding the oil coolant 42 to the through holes 86 easily. Stated otherwise, drive conditions such as the speed of rotation of the motor 12 have less effect on the supply amount of the oil coolant 42 by the pump.

In the present embodiment, the side cover 30 has the second outlet hole 38 for supplying the oil coolant 42 to the bottom wall 70, on one side (on the left in FIG. 2) of the rotational shaft 50 with respect to the bottom wall 70 of the tubular member 52. The second outlet hole 38 is disposed radially inward (along the direction R2) of the first protrusive wall 82 and faces the bottom wall 70 in the axial direction X2. In this structure, the oil coolant 42 can be guided to the reservoir 88 efficiently, since the oil coolant 42, which is ejected or discharged toward the bottom wall 70 of the tubular member 52, is guided to the reservoir 88 formed radially inward, i.e., in the direction R2 of the first protrusive wall 82 by gravity. Further, the oil coolant 42, which reaches the bottom wall 70 of the tubular member 52 radially inward of the first protrusive wall 82 (along the direction R2) from the second outlet hole 38, is guided to the reservoir 88 under centrifugal forces that act on the oil coolant 42. Thus, the oil coolant 42 can be guided to the reservoir 88 efficiently.

In the present embodiment, the rotational shaft 50 has the first axial flow passage 54 and the axial opening 53 which establishes communication between the first axial flow passage 54 and the outside of the rotational shaft 50. The first protrusive wall 82 has a portion that overlaps with the axial opening 53, as viewed along the radial directions R1, R2 of the rotor 20 (see FIG. 2). In this structure, the oil coolant 42, which overflows the first axial flow passage 54, is guided to the reservoir 88 formed radially inward, i.e., in the direction R2 of the first protrusive wall 82 under centrifugal forces or by gravity. Thus, the oil coolant 42 can be guided to the reservoir 88 efficiently.

In the present embodiment, an inner circumferential surface of the first protrusive wall 82 facing in the direction R2 has the greater-diameter portion 90, which is progressively greater in diameter in a direction from the one end side of the rotational shaft 50 (on the left in FIG. 2) to the other end side thereof (on the right in FIG. 2). In this structure, the greater-diameter portion 90 can guide the oil coolant 42 from the one end side to the other end side of the rotational shaft 50 under centrifugal forces that act on the oil coolant 42 during rotation of the rotor 20. Accordingly, the greater-diameter portion 90 can enhance the movement of the oil coolant 42 in the tubular member 52, and thereby effectively cool the members such as the rotor core 60.

The resolver rotor 24 is fixed to the first protrusive wall 82 according to the present embodiment. Therefore, the first protrusive wall 82 functions both to provide the reservoir 88 for the oil coolant 42, and to retain the resolver rotor 24. Consequently, the motor 12 can be simpler in structure than if a member for retaining the resolver rotor 24 were provided separately from the first protrusive wall 82.

The planet gear 76 (gear mechanism), which is coupled to the rotational shaft 50, is disposed in the tubular member 52 according to the present embodiment (see FIGS. 1 and 2). In the above structure, by disposing the planet gear 76 in the tubular member 52, it is possible to reduce the dimension of the motor 12 along the axial directions X1, X2. Further, in addition to cooling the rotor core 60, it also is possible to cool or lubricate the planet gear 76. Therefore, as opposed to providing the cooling structure for the rotor core 60 and the cooling structure for the planet gear 76 separately from each other, the structure can be made simpler.

In the present embodiment, the second protrusive wall 84 is formed on the bottom wall 70 of the tubular member 52 and projects toward the other end side of the rotational shaft 50 (along the direction X2) radially outward of the through holes 86 along the direction R1. The distal end of the second protrusive wall 84 overlaps with a portion of the planet gear 76, as viewed in the radial directions R1, R2 (see FIG. 2).

In the above structure, the oil coolant 42, which scatters under centrifugal forces radially outward along the direction R1, is guided to the planet gear 76, and can be used to cool or lubricate the planet gear 76. Thereafter, the oil coolant 42, which has been used to cool or lubricate the planet gear 76, further moves under centrifugal forces radially outward along the direction R1. When the oil coolant 42 reaches an inner circumferential surface of the tubular member 52, the oil coolant 42 can also cool the rotor core 60.

B. Modifications

The present invention is not limited to the above embodiment, but various other arrangements may be employed based on the disclosed content of the present description. For example, the present invention can employ the following arrangements.

1. Objects to which the Present Invention is Applicable

In the above embodiment, the motor 12 is mounted on the vehicle 10. However, the present invention is applicable to other situations in which the motor 12 may be employed. For example, although the motor 12 is used to propel the vehicle 10 in the above embodiment, the motor 12 may be used in other applications in the vehicle 10 (e.g., an electric power steering system, an air conditioner, an air compressor, etc.). Alternatively, the motor 12 may be used on industrial machines, home electric appliances, etc.

2. Motor 12

In the above embodiment, the motor 12 is a three-phase AC motor. However, the motor 12 may be another type of AC motor or a DC motor, for example, which is cooled by a cooling fluid, or which is of a reduced size. In the above embodiment, the motor 12 comprises a brushless motor. However, the motor 12 may be a brush motor. In the above embodiment, the motor stator 22 is disposed radially outward (along the direction R1) of the motor rotor 20 (see FIG. 1, etc.). However, the motor stator 22 may be disposed radially inward of the motor rotor 20.

3. Resolver 31

In the above embodiment, the resolver rotor 24 is mounted on the first protrusive wall 82. However, the resolver rotor 24 may be fixed to another member other than the first protrusive wall 82, insofar as the oil coolant 42 is capable of being supplied from the bottom wall 70 of the tubular member 52 to the inside of the tubular member 52, or in view of the structure of the electric power system.

4. Cooling System

4-1. Cooling Fluid

In the above embodiment, the oil coolant 42 is used as a cooling fluid. However, rather than the oil coolant 42, another cooling fluid (e.g., water or the like) may be used from the standpoint of effecting the cooling function. However, in this case, potentially, the other cooling fluid may not be used as a lubricant for lubricating the gear mechanisms such as the planet gear 76, etc.

4-2. Tubular Member 52

In the above embodiment, the planet gear 76, which is coupled to the rotational shaft 50, is disposed in the tubular member 52. However, a different type of gear mechanism may be disposed in the tubular member 52. Alternatively, other members may be disposed in the tubular member 52 that are cooled by the cooling medium. For example, a frictional engagement unit (clutch mechanism) (not shown), which is coupled to the rotational shaft 50, may be disposed in the tubular member 52, instead of the speed reducer 14 (planet gear 76).

By disposing a frictional engagement unit in the tubular member 52, it is possible to reduce the dimension of the motor 12 along the axial directions X1, X2. Further, in addition to cooling the rotor core 60, it also is possible to cool or lubricate the frictional engagement unit (assuming that the cooling fluid doubles as a lubricating oil). Therefore, as opposed to providing the cooling structure for the rotor core 60 and the cooling structure for the frictional engagement unit separately from each other, the structure can be made simpler.

The invention claimed is:
1. A rotary electric machine comprising:
a motor rotor; and
a coolant supply unit configured to supply a cooling fluid for cooling the motor rotor,
the motor rotor including:
a rotational shaft having one end and another end opposite to the one end;
a tubular member extending along the rotational shaft, having a bottom wall disposed on the one end side of the rotational shaft and an opening disposed on the another end side of the rotational shaft, the bottom wall being fixed to an outer circumferential surface of the rotational shaft; and
a rotor core fixed to an outer circumferential surface of the tubular member,
wherein the coolant supply unit has an outlet hole at a point spaced apart from and facing the bottom wall of the tubular member in an axial direction of the rotational shaft, the outlet hole being configured to supply the cooling fluid toward the bottom wall of the tubular member,
the bottom wall of the tubular member has a through hole extending along the axial direction of the rotational shaft, and
the cooling fluid is supplied through the through hole to inside of the tubular member, a first protrusive wall is annularly formed on the bottom wall of the tubular member and projects toward the one end side of the rotational shaft from a portion positioned radially outward of the through hole, and the outlet hole is disposed radially inward of the first protrusive wall and faces the bottom wall of the tubular member in the axial direction.

2. The rotary electric machine according to claim 1, wherein the coolant supply unit includes:

an axial flow passage formed in the rotational shaft; and an axial opening configured to establish communication between the axial flow passage and outside of the rotational shaft, and wherein the protrusive wall has a portion that overlaps with the axial opening, as viewed along a radial direction of the motor rotor.

3. The rotary electric machine according to claim 1, wherein an inner circumferential surface of the protrusive wall has a greater-diameter portion including a recess recessed in a radial direction in which depth of the recess becomes gradually greater from the one end side toward the another end side of the rotational shaft.

4. The rotary electric machine according to claim 1, wherein a rotor of a rotary sensor is fixed to the protrusive wall.

5. The rotary electric machine according to claim 1, wherein a gear mechanism, which is coupled to the rotational shaft, is disposed in the tubular member.

6. The rotary electric machine according to claim 5, wherein a second protrusive wall is formed on the bottom wall of the tubular member and projects toward the another end side of the rotational shaft from a portion positioned radially outward of the through hole, and a distal end of the second protrusive wall overlaps with a portion of a gear of the gear mechanism, as viewed along the radial direction of the motor rotor.

7. The rotary electric machine according to claim 1, wherein a second annular protrusive wall is formed on the bottom wall of the tubular member and projects toward the another end side of the rotational shaft from a portion positioned radially outward of the through hole, and wherein the coolant supply unit includes:

an axial flow passage formed in the rotational shaft; and an axial opening configured to establish communication between the axial flow passage and outside of the rotational shaft, and wherein the second protrusive wall has a portion that overlaps with the axial opening, as viewed along a radial direction of the motor rotor.

* * * * *